INVENTOR.
G. THODOS
BY Hudson and Young
ATTORNEYS

INVENTOR.
G. THODOS
BY Hudson & Young
ATTORNEYS

Patented Jan. 4, 1949

2,457,963

UNITED STATES PATENT OFFICE 2,457,963

PELLETING CARBON BLACK

George Thodos, Bartlesville, Okla., assignor to Phillips Petroleum Company, a corporation of Delaware Application January 21, 1946, Serial No. 642,447

5 Claims. (Cl. 18—1)

This invention relates to a process for the agglomeration of carbon black and to apparatus for carrying out the process. In one of its more specific aspects the present invention relates to the agglomeration of carbon black with a solution of rubber to form a pelleted product.

Carbon black is produced by the thermal decomposition of hydrocarbons. Many processes are known and used in its production. These produce a wide variety of types and grades of this particular form of carbon. Two types of processes are widely used for the production of most carbon black. One is the so-called "channel" process in which hydrocarbon gas is burned in luminous flames which impinge on cool steel beams or "channels." The finely divided particles of carbon, similar in appearance to soot, are scraped from the channels and, after compacting into a more dense form, packaged for shipment. Rotating plates are sometimes employed in place of channels as collecting surfaces for the carbon. The other process which is rather widely used is the so-called "furnace" process in which a hydrocarbon gas or oil is decomposed by heating to a temperature at which free carbon is liberated in a finely divided amorphous state. The flocculent carbon so produced is collected, compacted, and packaged for shipment. Other processes are used for the production of special blacks for particular uses.

Carbon black is used as a pigment and as a compounding ingredient in the manufacture of rubber. The major proportion of the carbon black produced is used in the manufacture of rubber goods. Carbon black imparts desirable abrasion resistance to rubber goods and is widely used for this purpose, almost exclusively, in the manufacture of tires for vehicles. In the compounding of rubber with carbon black, the black must be highly dispersed in the rubber. Conventionally, the dispersion is accomplished by mixing the rubber with carbon black by kneading in a Banbury or by milling on rolls. Carbon black in powdered form liberates a large quantity of dust in these mixing operations. This dust is an annoyance and a hazard to workmen and, in addition, a contaminant to white or colored rubber goods which may be processed in the same building. To reduce the dust problem in handling and using carbon black, it is now customary to form the raw carbon black into small pellets or briquettes which have a higher bulk density than the carbon black as initially produced and which are substantially dustless in character. Commercial pellets vary in size from about one-thirty second to about three-eighths inch in diameter.

In the compounding of natural rubber, carbon black produced by the channel process is generally preferred; with synthetic rubber, on the other hand, carbon black produced by the furnace process is preferred. The present process may be employed for pelleting either of these widely used carbon black products.

Throughout this specification, the term "pelleting" is used in its broadest sense to designate the agglomeration of powdered material into larger particles, regardless of the process by which the agglomeration is effected or the nature of the particle produced. The term "pellet" is used to designate the agglomerate particle.

The term "rubber" is used in its broadest sense and includes vulcanizable natural hydrocarbon gums and polymers or copolymers of polymerizable organic compounds; the former are referred to as natural rubbers while the latter are referred to as synthetic rubbers. The term "synthetic rubber" used in this specification is in accordance with the use of this term in the art and includes the polymerization products of olefins, diolefins, styrene and its derivatives, alkyl esters of acrylic and alkacrylic acid (e. g., methyl acrylate and methyl methacrylate), and other organic compounds having at least one active vinyl group ($CH_2=C<$). These compounds are polymerized alone or in admixture with one another to produce various synthetic rubbers.

Carbon black, as initially produced is a finely divided flocculent powder having an apparent bulk density of about 3 pounds per cubic foot. It may be densified by mechanical agitation to give a powder having a bulk density of about 12 pounds per cubic foot. The densifying operation apparently reduces the quantity of air or other gases associated with the carbon black without appreciable agglomeration of the carbon black particles. The density may be further increased by mechanical agitation of the dry carbon black or by imparting a rolling motion to the carbon black particles. This operation forms agglomerates or pellets of carbon black resulting in particles ranging in size from about 8 mesh to about 100 mesh. Particles larger or smaller in size may be formed, but in general the foregoing range represents the desirable limits. Preferably the carbon black particles so formed are about 10 mesh in size, or within the range of about 8 mesh to about 40 mesh. Dry pelleting of carbon black has proven very satisfactory for channel blacks, but is less useful for pelleting of soft blacks, or furnace blacks.

Carbon black may be pelleted by any of the so-called wet pelleting processes. There are two methods of wet pelleting in general use. In one, the raw carbon black is admixed with sufficient water to form a paste, extruded through dies and broken into columnar segments. The other method involves wetting of a portion of the raw carbon black, preferably with a fine spray, while subjecting the carbon black to mechanical agitation which agglomerates the carbon black. Pellets formed by either of these methods are subjected to a drying operation to remove the water therefrom prior to packaging and shipping.

Another method of increasing the bulk density of carbon black prior to shipping is used to some extent, particularly for soft blacks or furnace blacks. By this method the carbon black is first predensified as described hereinbefore to a bulk density of about 12 pounds per cubic foot and the predensified carbon black is then compressed into a cake having a bulk density of about 25 pounds per cubic foot. Often the predensified black is put in shipping containers, paper bags, for example, prior to the compressing operation. Prior to use, the cake of carbon black must be disintegrated. The bagging, compressing, and disintegrating operations cause large amounts of carbon black dust to be liberated, making these operations disagreeable for the operators.

The present invention provides a process for the production of small discrete particles or pellets of carbon black intimately dispersed in rubber. These particles or pellets are of substantially uniform size, are dustless in character, and possess the desirable characteristic of being readily dispersible in rubber in rubber compounding operations. The product has high mechanical strength, resists crushing under normal shipping conditions, yet is readily broken down and dispersed by milling. In accordance with this invention carbon black is admixed with a solution of rubber. Either natural or synthetic rubber may be used; the choice is determined primarily by the ultimate use of the carbon black. For example, a soft furnace black preferred for the compounding of synthetic rubber is preferably dispersed in synthetic rubber by the process of this invention. Any suitable solvent may be employed in making up the rubber solution.

In accordance with this invention, flocculent carbon black is admixed with a solution of rubber to form a slurry of carbon black and said rubber solution. The slurry is then broken into separate particles and the solvent evaporated therefrom. The slurry may be handled by pumping and broken up by atomizing or spraying to form droplets from which the solvent is evaporated. This produces small pellets or discrete particles of carbon black dispersed in and intimately admixed with rubber. In a specific embodiment of this invention, the spray of slurry is contacted with a dispersion of flocculent carbon black in a heated gas or vapor. This coats each small drop or particle of the spray with finely divided carbon while at the same time evaporating solvent from the drops to form stable pellets. It is generally desirable to use considerably less rubber than is used in the formulation of finished rubber goods. In most instances it is preferable by the present process to use only sufficient rubber to bind the carbon black into stable, dustless pellets.

An object of this invention is to provide a process for pelleting carbon black. Another object is to provide a process for forming small discrete particles of carbon black intimately dispersed in rubber. Another object is to provide such a process in which a solution of rubber is used as a binder for the carbon black. Still another object is to provide apparatus for pelleting carbon black. Other objects and advantages will be apparent to those skilled in the art from the accompanying drawing and the following detailed disclosure.

In accordance with one embodiment of this invention discrete particles or pellets of carbon black intimately dispersed in rubber are produced by forming droplets of the slurry of carbon black in rubber solvent by spraying and drying the spray particles. The slurry is sprayed into an atmosphere of a heated gas, suitably nitrogen, carbon dioxide, or flue gas, which is inert with respect to the solvent. The heated gas evaporates solvent from the particles producing a hard, substantially dustless pellet. In a preferred embodiment flocculent carbon black is dispersed in the heated gas and serves to coat the exterior surface of each particle by adhesion to the rubber solution or cement. The size of the pellets so produced may be controlled by regulation of the size of the droplets of slurry.

In a preferred specific embodiment of my invention the pellets are formed in an elongated cylindrical zone in a vertical position. The slurry is introduced into one end of the zone in the form of droplets or a spray. Flocculent carbon black is dispersed in a heated gas, inert to the solvent and this suspension introduced into the vertical cylinder at one or more points intermediate the ends thereof and in a direction tangent to the inner surface of the cylinder. This imparts a whirling motion to the gas and suspended carbon black insuring intimate contact with the particles of the spray. The pellets so formed are removed from the end of the zone opposite that at which the slurry is introduced.

The proportions of rubber, carbon black, and solvent employed is somewhat variable, depending upon the specific rubber or carbon black used and the product desired. In general, it is desirable to use only enough rubber to effectively coat the carbon black particles and bind them into a solid, compact pellet. A solution of 1 to 5 per cent rubber (by weight) is satisfactory for this purpose. Any suitable rubber solvent may be used; benzene and carbon tetrachloride are the preferred solvents. Carbon black may be added to the rubber solution in varying amounts. Generally, as much carbon black as possible is used while still maintaining a slurry (as distinguished from a paste). From 15 to 25 parts carbon black by weight per 100 parts rubber solution forms a satisfactory slurry containing from about 13 to about 20 per cent carbon black by weight. The quantity of carbon black dispersed in the heated gas is not critical. Flue gas is satisfactory as an inert gas to be used in the process; obviously, nitrogen, carbon dioxide, and other inert gases may be used.

Figure 1:
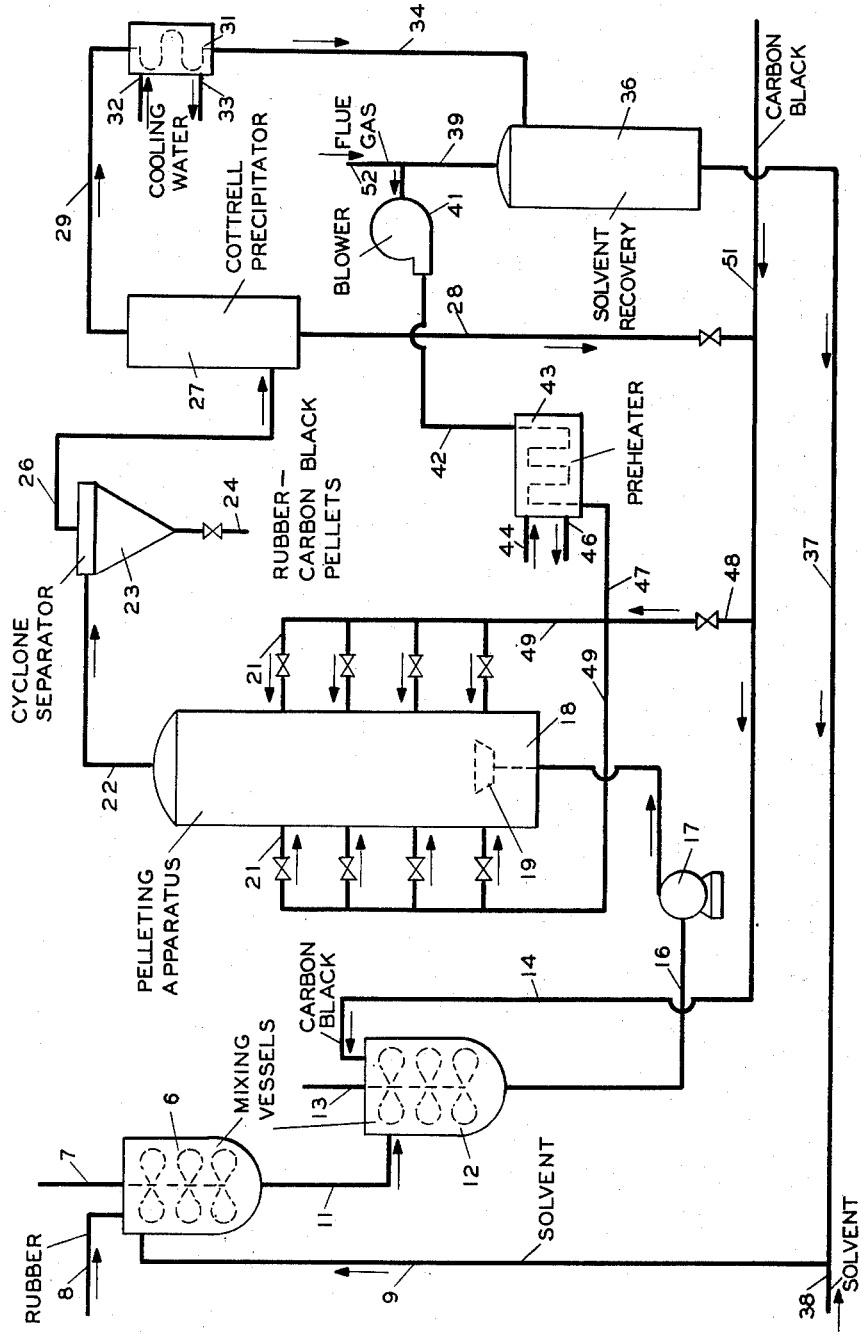
Fig. 1 is a diagrammatic view of a preferred embodiment of apparatus of the present invention.

With reference to Fig. 1 of the drawing, a solution of rubber in a suitable solvent is made up in vessel 6 which is provided with an agitator 7.

Crude rubber is added to the vessel at 8 while solvent enters by way of line 9. The solution of rubber is passed via line 11 to a second vessel 12 provided with an agitator 13. Carbon black is supplied to vessel 12 through conduit 14 in an amount sufficient to produce a slurry of carbon black and rubber solution of the proper viscosity. The slurry is withdrawn from the vessel through line 16 and is transferred by pump 17 to one end of the pelleting apparatus 18 which comprises a vertical cylindrical zone. The slurry is sprayed or atomized in the cylinder by means of a sprayer 19 attached to line 16. In the cylindrical pelleting zone 18 the droplets of slurry produced by the sprayer are intimately contacted with a dispersion of flocculent carbon black introduced into the cylinder through conduits 21. Conduits 21 enter the pelleting zone 18 tangent to the inner surface of the cylinder. By this means a tangential blanket of hot gases containing suspended carbon black is created and assumes a helical upward motion. Flocculent carbon black contacting the droplets of slurry adheres to the exterior surfaces of the droplets and forms a coating thereon. The hot gases introduced through lines 21 vaporizes solvent from the droplets of carbon black and rubber solution forming uniform pellets of carbon black bonded with rubber. The pellets, together with the gases containing solvent vapors and flocculent carbon black are discharged through a conduit 22 into a cyclone separator 23. In the separator 23 the pellets drop out of the gas stream and are withdrawn through a conduit 24 as free flowing, discrete particles of carbon black intimately admixed with rubber. The gases, solvent vapors, and flocculent carbon black pass via conduit 26 into a Cottrell precipitator 27.

In the Cottrell precipitator the flocculent carbon black is separated from the gases and solvent vapors and is withdrawn via conduit 28 for recycling to the pelleting process. The gases and solvent vapors are carried via conduit 29 to a cooler 31 in which a portion of the solvent vapors are condensed. Cooling water is supplied to cooler 31 through line 32 and is discharged therefrom through line 33. The condensed solvent and uncondensed gases and vapors pass via conduit 34 to a separator or solvent recovery unit 36 wherein the solvent is separated from the gases and is withdrawn through line 37 to line 9 for use in making up the rubber solution. Additional solvent is supplied to the system through line 38 as needed to make up for solvent losses in the system. The gases and any unseparated solvent vapors remaining in the gas stream are withdrawn from the separator through conduit 39 to a blower 41. From the blower these gases are passed through conduit 42 to a preheater 43.

The gases are heated in the preheater 43 by indirect heat exchange with steam which is supplied to the preheater through line 44. The resulting condensate is withdrawn from the preheater through line 46. In the preheater, the gases are heated to a temperature of approximately 200° F. The preheated gases pass through conduit 47 and are admixed with flocculent carbon black from conduit 48. This effects dispersion of flocculent carbon black in the gases which are then passed via conduits 49 to conduits 21 for injection into the pelleting zone. Additional carbon black is supplied to the system through conduit 51. Flue gas is admitted to the system through line 52 to supply inert gases which may be lost from the apparatus at various points.

Figure 2:
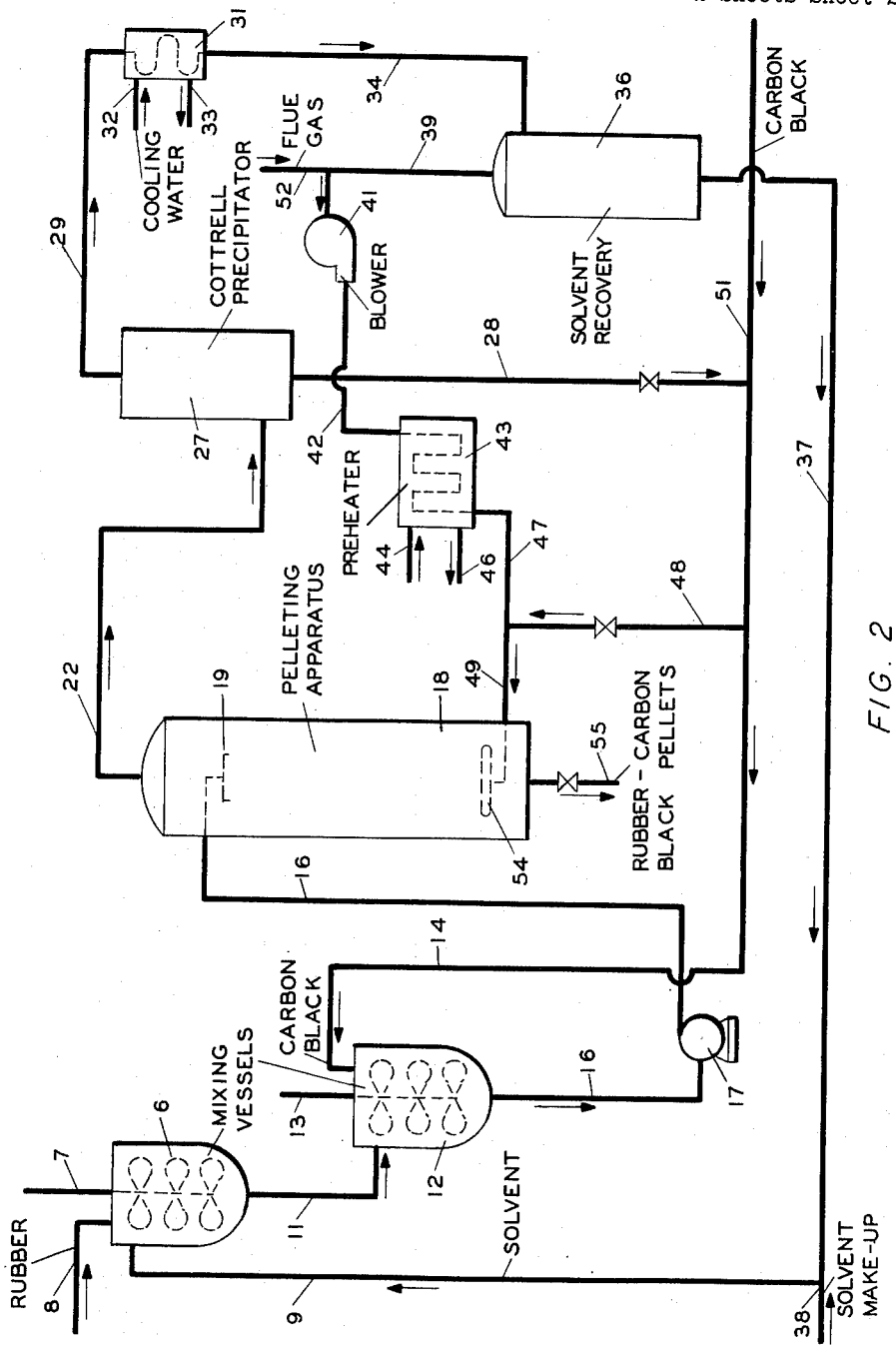
Fig. 2 is a diagrammatic view of an alternative arrangement of apparatus for carrying out the process of my invention.

With reference to Fig. 2 of the drawing, the pelleting zone is modified by disposing the sprayer 19 in the upper portion of the zone near the outlet conduit 22. The dispersion of carbon black in the heated gases enters the pelleting cylinder at a point near the bottom and is directed upwardly by a distributor 54. The droplets of slurry from the sprayer 19 fall countercurrent to the hot gases and carbon black. The hot gases evaporate solvent from the droplets which then collect in the lower portion of the pelleting zone. By means of this countercurrent operation, the droplets and resulting pellets are substantially completely freed of solvent, since drying is at a maximum in the lower portion of the pelleting zone. The rubber-carbon black product in the form of pellets is withdrawn from the zone through conduit 55. The gases, flocculent carbon black, and solvent vapors pass via conduit 22 to the Cottrell precipitator. This arrangement of apparatus obviates the use of a cyclone separator in line 22.

*Example*

Standard GR-S, a copolymer prepared by the polymerization of 75 parts by weight 1,3-butadiene and 25 parts by weight of styrene in an aqueous emulsion, was dissolved in benzene to form a 2 per cent (by weight) solution of rubber. Flocculent carbon black was admixed with the rubber solution using 20 parts carbon black by weight per 100 parts of rubber solution. This gave a slurry of carbon black and rubber solution containing approximately 17 per cent carbon black by weight. Flocculent carbon black was dispersed in heated carbon dioxide in a container using a blower to maintain the suspension. Droplets of the slurry were dropped into the suspended carbon black. A large part of the solvent was evaporated from the droplets and some additional carbon black adhered to the outer surfaces of the droplets. The particles of carbon black and rubber so produced were removed from the container, separated from the flocculent carbon black, and the remaining solvent evaporated therefrom. The product so produced was in the form of small beads or pellets which were uniform in size, free-flowing, and substantially dustless.

The foregoing specific example is given by way of illustration only. It will be obvious to one skilled in the art that various modifications may be employed without departing from the spirit of my invention.

I claim:

1. A process for the production of small discrete particles of carbon black and rubber comprising spraying a slurry of carbon black in a solution of rubber axially and at a central point into the inlet end of a cylindrical contacting zone having an inlet end and an outlet end with respect to flow of said carbon black and rubber, maintaining a helically moving hollow cylindrical layer of hot gas and flocculent carbon black adjacent the cylindrical wall of said zone and surrounding said sprayed slurry of carbon black and rubber and removing dry discrete particles of carbon black and rubber containing a surface layer of carbon black.

2. A process for the production of small discrete particles of carbon black and rubber comprising spraying a slurry of carbon black in a solution of rubber axially and at a central point into the inlet end of a cylindrical contacting zone having an inlet end and an outlet end with respect to flow of said carbon black and rubber, injecting tangentially a suspension of flocculent carbon black in a gas at a temperature of about 200° F. into the contacting zone at a point intermediate the ends thereof, said tangentially injected gas and carbon black forming a helically moving hollow cylindrical layer surrounding said sprayed slurry of carbon black and rubber and mixing therewith, and removing effluent comprising dry discrete particles of carbon black and rubber having a surface layer of carbon black, vaporized solvent, hot gas and flocculent carbon black, and recovering the discrete particles of carbon black and rubber having a surface layer of carbon black as the product of the process.

3. A process for producing small discrete particles of carbon black and rubber containing a coating of carbon black comprising admixing flocculent carbon black with a solution of from 1 to about 5 per cent rubber by weight in a solvent to form a slurry of carbon black in said solution containing from about 13 to about 20 per cent carbon black by weight, spraying said slurry into the inlet end of a cylindrical contacting zone and at a central point thereof, said cylindrical contacting zone having an inlet end and an outlet end with respect to flow of said slurry, introducing tangentially a suspension of flocculent carbon black in a hot gas into the contacting zone at a point intermediate the ends but near the inlet end thereof and maintaining in said zone a helically moving hollow cylindrical layer of said hot gas and carbon black adjacent the cylindrical wall, and removing effluent comprising dry discrete particles of carbon black and rubber having a surface layer of carbon black, vaporized solvent, hot gas and flocculent carbon black, and recovering the discrete particles of carbon black and rubber having a surface layer of carbon black as the product of the process.

4. The process of claim 3 wherein the hot gas and flocculent carbon black are injected tangentially at a temperature of about 200° F.

5. An apparatus for the production of small discrete particles of carbon black intimately dispersed in rubber and covered with an exterior layer of carbon black comprising means for forming a slurry of carbon black and a solution of rubber, means for dispersing carbon black in a gas, an elongated cylindrical vessel, a pipe disposed through the sidewall of the vessel and disposed in such a position that hot gas and carbon black passing therethrough and into the vessel enter the vessel in a direction tangent to the cylindrical sidewall and perpendicular to the longitudinal axis of the vessel, spray means for introducing slurry into one end of said vessel and means for removing vessel effluent from the other end, and means for recovering particles of carbon black and rubber coated with a layer of carbon black from the vessel effluent.

GEORGE THODOS.

REFERENCES CITED

The following references are of record in the file of this patent:

UNITED STATES PATENTS

| Number | Name | Date |
| --- | --- | --- |
| Re. 22,454 | Wiegand et al. | Mar. 7, 1944 |
| 2,002,252 | Stam | May 21, 1935 |
| 2,082,304 | Stam | June 1, 1937 |
| 2,086,997 | Stubner | July 13, 1937 |
| 2,123,482 | Long | July 12, 1938 |
| 2,228,704 | Offutt | Jan. 14, 1941 |

FOREIGN PATENTS

| Number | Country | Date |
| --- | --- | --- |
| 270,658 | Great Britain | Apr. 12, 1928 |